US010628035B2

(12) United States Patent
Funakawa

(10) Patent No.: US 10,628,035 B2
(45) Date of Patent: Apr. 21, 2020

(54) IMAGE PROCESSING APPARATUS, METHOD FOR CONTROLLING THE SAME, AND STORAGE MEDIUM

(71) Applicant: KONICA MINOLTA, INC., Chiyoda-ku, Tokyo (JP)

(72) Inventor: Hisataka Funakawa, Okazaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 356 days.

(21) Appl. No.: 14/963,720

(22) Filed: Dec. 9, 2015

(65) Prior Publication Data

US 2016/0170638 A1 Jun. 16, 2016

(30) Foreign Application Priority Data

Dec. 12, 2014 (JP) .................................. 2014-251843

(51) Int. Cl.
*G06F 3/0488* (2013.01)
*G06F 3/041* (2006.01)
(Continued)

(52) U.S. Cl.
CPC ........ *G06F 3/04886* (2013.01); *G06F 1/1698* (2013.01); *G06F 3/0416* (2013.01);
(Continued)

(58) Field of Classification Search
CPC .. G06F 3/04886; G06F 3/0488; G06F 3/0416; G06F 1/1698; G06F 2203/04106;
(Continued)

(56) References Cited

U.S. PATENT DOCUMENTS

2008/0291283 A1* 11/2008 Achiwa .............. H04N 1/00204
348/207.2
2011/0076951 A1* 3/2011 Hatano ................. H04W 8/005
455/41.3
(Continued)

FOREIGN PATENT DOCUMENTS

JP 2013-235488 A 11/2013
JP 2014-26335 A 2/2014
(Continued)

OTHER PUBLICATIONS

Office Action (Communication pursuant to Article 94(3) EPC) dated Sep. 11, 2017, by the European Patent Office in corresponding European Patent Application No. 15198429.1. (7 pages).
(Continued)

*Primary Examiner* — Ajay M Bhatia
*Assistant Examiner* — Mong-Shune Chung
(74) *Attorney, Agent, or Firm* — Buchanan Ingersoll & Rooney PC

(57) ABSTRACT

An image processing apparatus includes a touch panel capable of displaying a plurality of software keys, an input control unit that receives input of information provided to the touch panel in response to a user's touch operation on the software keys, a short-range wireless sensor, and an object sensor. The short-range wireless sensor is arranged near the touch panel to sense radio waves for short-range wireless communication with a mobile terminal. The input control unit is configured to change an arrangement of the software keys on a display of the software keys on the touch panel such that the software keys are not arranged in a region of the touch panel near the short-range wireless sensor when the presence of the object near the short-range wireless sensor is sensed by the object sensor.

9 Claims, 23 Drawing Sheets

(51) Int. Cl.
  *G06F 1/16* (2006.01)
  *H04W 4/80* (2018.01)
  *H04M 1/725* (2006.01)
(52) U.S. Cl.
  CPC ............ *G06F 3/0488* (2013.01); *H04W 4/80* (2018.02); *G06F 2203/0384* (2013.01); *G06F 2203/04106* (2013.01); *G06F 2203/04108* (2013.01); *G06F 2203/04803* (2013.01); *H04M 1/7253* (2013.01); *H04M 1/7258* (2013.01); *H04M 1/72583* (2013.01); *H04M 2250/04* (2013.01)
(58) Field of Classification Search
  CPC . G06F 2203/04108; G06F 2203/04803; G06F 2203/0384; H04W 4/008; H04M 2250/04; H04M 1/7258; H04M 1/72583; H04M 1/7253
  See application file for complete search history.

(56) References Cited

U.S. PATENT DOCUMENTS

| | | | | |
|---|---|---|---|---|
| 2012/0026200 | A1* | 2/2012 | Okada | G06F 3/04886 345/660 |
| 2013/0300668 | A1* | 11/2013 | Churikov | G06F 3/041 345/168 |
| 2014/0253949 | A1* | 9/2014 | Tsujimoto | H04N 1/0084 358/1.14 |

FOREIGN PATENT DOCUMENTS

| | | |
|---|---|---|
| JP | 2014197288 A | 10/2014 |
| JP | 2014-232985 A | 12/2014 |
| JP | 2016074164 A | 5/2016 |
| WO | 2014/192583 A1 | 12/2014 |

OTHER PUBLICATIONS

Office Action (Final Decision for Rejection) dated Mar. 28, 2017, by the Japanese Patent Office in corresponding Japanese Patent Application No. 2014-251843 and an English Translation of the Office Action. (6 pages).

Office Action (Notice of Grounds of Rejection) dated Jan. 17, 2017, by the Japanese Patent Office in corresponding Japanese Patent Application No. 2014-251843 and English translation of the Office Action. (10 pages).

Extended European Search Report dated Apr. 19, 2016, issued by the European Patent Office in the corresponding uropean Application No. 15198429.1. (9 pages).

Chinese Office Action dated Dec. 12, 2017 in corresponding Chinese Patent Application 201510920013.5, with English Translation (18 pages).

Office Action dated Jul. 6, 2018, by the Chinese Patent Office in corresponding Chinese Patent Application No. 201510920013.5 and English translation of the Office Action. (17 pages).

* cited by examiner

FIG.23

<DISPLAY OF TERMINAL 400>

IMG13

BUSINESS CARD LIST
**COMPANY
**SALES DIVISION
* * *
TEL:****
FAX:****
Mail:****

WHEN TERMINAL 400 IS BROUGHT PROXIMATE WITH ADDRESS SETTING SCREEN BEING DISPLAYED, ADDRESS INFORMATION IS AUTOMATICALLY SET TO SELECTED ADDRESS

<DISPLAY OF OPERATION PANEL 300>

IMG04

ADDRESS SETTING SCREEN
PLEASE SELECT ADDRESS TO BE SET

| ADDRESS1 | ADDRESS2 |
| ADDRESS3 | ADDRESS4 |
| ADDRESS5 | ADDRESS6 |
| ADDRESS7 | ADDRESS8 |
| | NEXT PAGE |

# IMAGE PROCESSING APPARATUS, METHOD FOR CONTROLLING THE SAME, AND STORAGE MEDIUM

This application is based on Japanese Patent Application No. 2014-251843 filed with the Japan Patent Office on Dec. 12, 2014, the entire content of which is hereby incorporated by reference.

BACKGROUND OF THE INVENTION

Field of the Invention

The present disclosure relates to an image processing apparatus that conducts short-range wireless communication with an information terminal and a method for controlling the image processing apparatus, as well as a storage medium that non-transitorily stores a program executed by the image processing apparatus.

Description of the Related Art

In recent years, some terminal devices such as smart phones and tablet terminals are equipped with a function that conducts communication within a short range, for example, near field communication (NFC). This allows a user to conduct data communication using such a terminal device by waving the terminal device over a predetermined position of another electronic device. As one example of the above-mentioned "another electronic device", an image processing apparatus such as a multi-functional peripheral (MFP) may be employed. The image processing apparatus receives an operation mainly through an operation panel placed on a front face of the apparatus. Thus, in the image processing apparatus, the above-mentioned "predetermined position" for conducting short-range wireless communication with the terminal device (hereinafter also referred to as the "touch area") is often placed near the operation panel.

In the image processing apparatus, when the user intends to wave the terminal device over the touch area, the user's hand holding the terminal device may touch an operation unit despite the user's intention. Under such circumstances, the image processing apparatus may execute an operation unintended by the user due to operation information unintended by the user being input to the image processing apparatus. In the image processing apparatus, measures to prevent the user's unintended operation from occurring can be provided if an unintended approach of the user's hand can be sensed in advance.

To sense an unintended approach of the user's hand and provide measures therefor, Japanese Laid-Open Patent Publication No. 2013-235468, for example, discloses a mobile terminal equipped with sensors such as a pair of tactile sensors placed on opposite sides of a display device. This mobile terminal detects a range of contact with a human body using these sensors, and invalidates input to a region corresponding to the detected range.

In the mobile terminal disclosed in Japanese Laid-Open Patent Publication No. 2013-235468, the user grips a housing of the mobile terminal. The mobile terminal can thus sense an approach of the user's hand with the sensors as described above.

In the image processing apparatus described above, however, the user "waves" the terminal device over the touch area, and is unlikely to "grip" the operation panel. Thus, even if the image processing apparatus is simply provided with the sensors as disclosed in Japanese Laid-Open Patent Publication No. 2013-235468, it would be difficult to sense that the user holding the terminal device has approached and contacted the operation panel despite the user's intention, in advance of the contact.

The present disclosure was conceived in view of the foregoing actual circumstances, and aims to avoid operation of the image processing apparatus in response to a user's unintended contact.

SUMMARY OF THE INVENTION

According to an aspect of the present disclosure, an image processing apparatus is provided. The image processing apparatus includes a touch panel capable of displaying a plurality of software keys, a controller for controlling the image processing apparatus based on information provided to the touch panel in response to a user's touch operation on the software keys, a short-range wireless sensor arranged near the touch panel for sensing a radio wave for short-range wireless communication with a mobile terminal, and an object sensor configured to contactlessly sense presence of an object near the short-range wireless sensor. The controller is configured to change an arrangement of the software keys on a display of the software keys on the touch panel such that the software keys are not arranged in a region of the touch panel near the short-range wireless sensor when the presence of an object near the short-range wireless sensor is sensed by the object sensor.

According to another aspect of the present disclosure, a method for controlling an image processing apparatus is provided. The method is for controlling an image processing apparatus including a touch panel capable of displaying a plurality of software keys. The method includes receiving input of information provided to the touch panel in response to a user's touch operation on the software keys, contactlessly sensing presence of an object near a short-range wireless sensor, the short-range wireless sensor being arranged near the touch panel for sensing a radio wave for short-range wireless communication with a mobile terminal. The method further includes changing an arrangement of the software keys on a display of the software keys on the touch panel such that the software keys are not arranged in a region of the touch panel near the short-range wireless sensor when the presence of an object near the short-range wireless sensor is sensed.

According to still other aspect of the present disclosure, a non-transitory storage medium is provided that is encoded with a computer readable program executed by a computer of an image processing apparatus including a touch panel capable of displaying a plurality of software keys. The program causes the computer of the image processing apparatus to receive input of information provided to the touch panel in response to a user's touch operation on the software keys, contactlessly sense presence of an object near a short-range wireless sensor, the short-range wireless sensor being arranged near the touch panel for sensing a radio wave for short-range wireless communication with a mobile terminal. The program further causes the computer to change an arrangement of the software keys on a display of the software keys on the touch panel such that the software keys are not arranged in a region of the touch panel near the short-range wireless sensor when the presence of an object near the short-range wireless sensor is sensed.

The foregoing and other objects, features, aspects and advantages of the present invention will become more

BRIEF DESCRIPTION OF THE DRAWINGS

FIG. 23 is a diagram for use in explaining still another exemplary screen displayed on the display of the operation panel of the MFP according to the sixth embodiment.

DESCRIPTION OF THE PREFERRED EMBODIMENTS

Embodiments of the image processing apparatus will be hereinafter described with reference to the drawings. In the following description, identical parts and components are labeled with identical signs. These parts and components are also identical in name and function. Thus, the description thereof will not be repeated.

First Embodiment

<Summary of Operation of Image Processing Apparatus>

Figure 1:
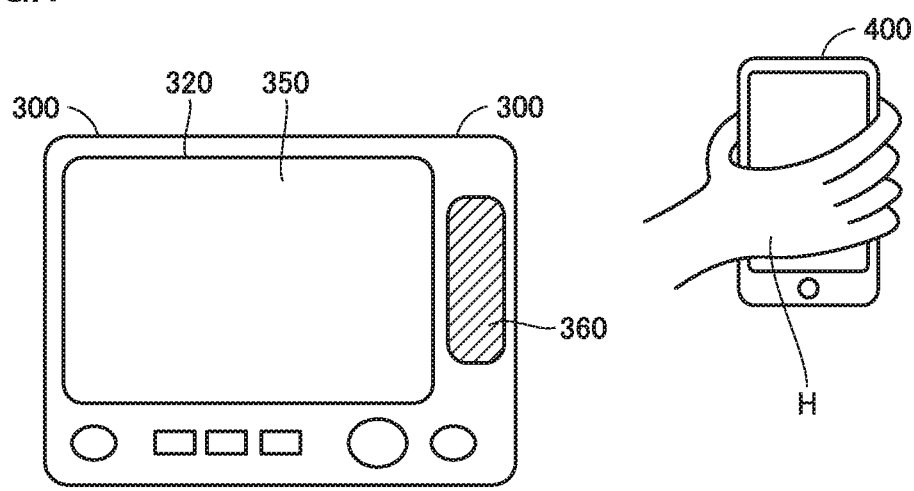
FIG. 1 is a diagram for use in explaining a summary of the operation of an MFP, which is an exemplary image processing apparatus according to a first embodiment.
Figure 2:
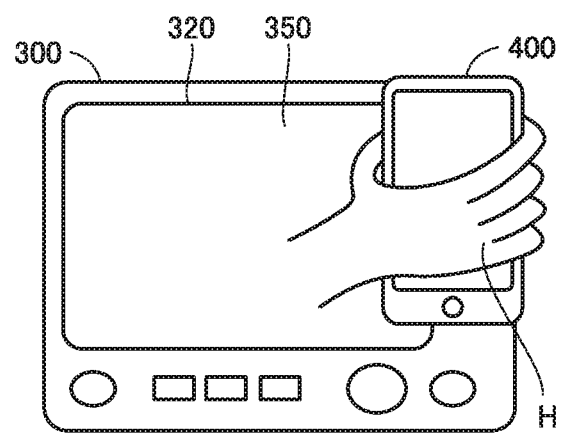
FIG. 2 is a diagram for use in explaining a summary of the operation of the MFP, which is an exemplary image processing apparatus according to the first embodiment.
Figure 3:
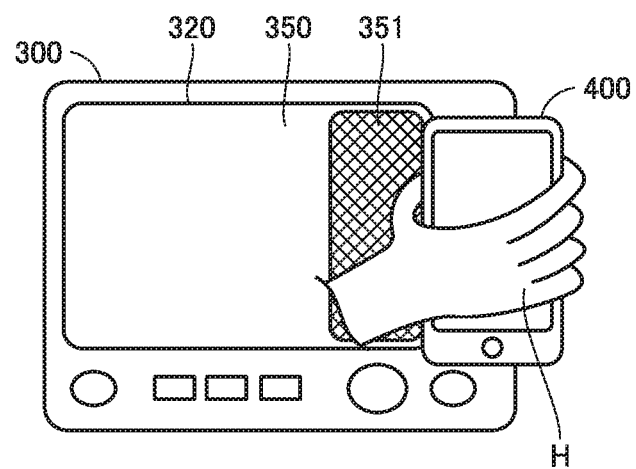
FIG. 3 is a diagram for use in explaining a summary of the operation of the MFP, which is an exemplary image processing apparatus according to the first embodiment.

FIGS. 1 to 3 are diagrams for use in explaining a summary of the operation of an MFP, which is an exemplary image processing apparatus according to a first embodiment. The MFP is a composite machine equipped with a plurality of functions, for example, a scanner function, a copy function, a facsimile function, a network function, and a BOX function. The BOX function is the function of storing data into a hard disk incorporated in the composite machine for retrieval and use of the data when required.

The MFP according to the first embodiment includes an operation panel 300 shown in FIG. 1. Operation panel 300 includes a display 320 and a touch sensor 350 attached to display 320. A touch panel is formed by display 320 and touch sensor 350.

Operation panel 300 also includes an antenna and a communication circuit for conducting short-range wireless communication such as NFC. A terminal for communicating with operation panel 300 of the MFP over short-range wireless communication is shown as a mobile terminal 400 in FIG. 1. A user's hand holding mobile terminal 400 is also shown as a hand H in FIG. 1.

MFP 100 conducts data communication with an NFC-compatible terminal contactlessly, in accordance with a wireless communication standard including, for example, a contactless integrated circuit (IC), as short-range wireless communication.

A housing of operation panel 300 includes a touch area 360, which is set as a region for indicating a preferred placement of the terminal with which the MFP is to communicate over short-range wireless communication. Touch area 360 is shown, for example, as a frame printed on the housing of operation panel 300. Touch area 360 is an exemplary short-range wireless sensing unit. Touch area 360 is placed near touch sensor 350, as shown in FIG. 1. This allows the terminal to communicate with the MFP while the use is viewing operation panel 300.

FIG. 2 shows a situation where the user is waving mobile terminal 400 over touch area 360. In the situation shown in FIG. 2, the user's hand H overlaps with display 320. In this situation, hand H may contact a portion of touch sensor 350 where input is to be received, despite the user's intention.

FIG. 3 shows a region of touch sensor 350 where input is to be invalidated (input invalidation region 351). The MFP according to the first embodiment detects whether or not the terminal is present near touch area 360. Where the MFP has sensed the presence of the terminal near touch area 360, it invalidates the input of information to input invalidation region 351. More specifically, even if a touch is made within input invalidation region 351 of touch sensor 350, the MFP does not receive the input corresponding to the touch or invalidates the input corresponding to the touch. This avoids input of the user's unintended information to touch sensor 350 due to the user's hand H waving mobile terminal 400 over touch area 360.

<Schematic Configuration of Image Processing Apparatus>

Figure 4:
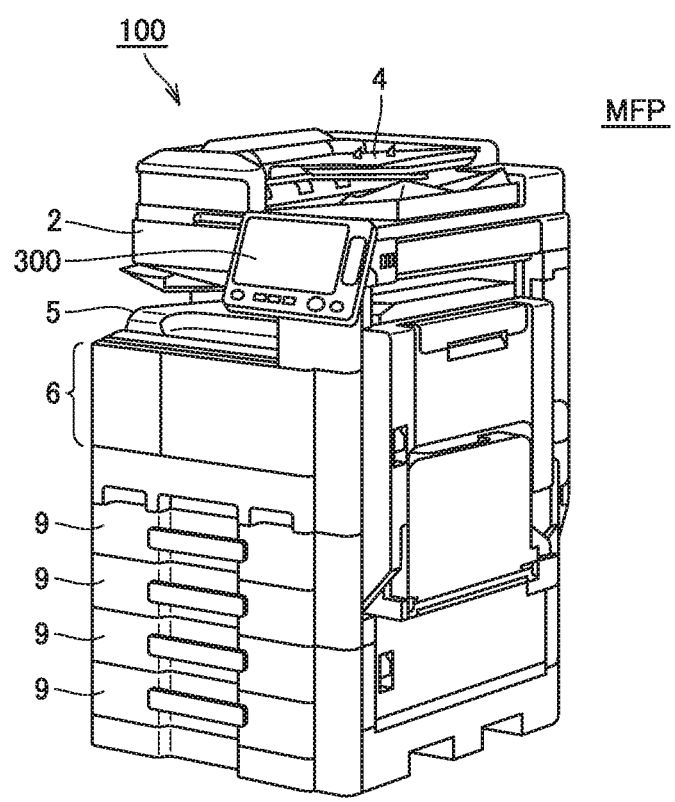
FIG. 4 is a perspective view showing an overall configuration of the MFP.

FIG. 4 is a perspective view showing an overall configuration of MFP 100.

MFP 100 in FIG. 4 includes a scanner unit 2 that optically reads a document to obtain image data, and a printing unit 6 that prints an image on paper based on the image data. A feeder 4 for delivering the document to scanner unit 2 is placed on an upper face of a main body of image forming apparatus MFP 100. A plurality of paper feed units 9 for feeding paper to printing unit 6 are placed on lower portions of MFP 100. A tray 5 for ejection of the paper having the image formed thereon by printing unit 6 is placed on a central portion of MFP 100.

In MFP 100, operation panel 300 is attached to a front face side of an upper portion of the main body of MFP 100. The term "front face" as used herein refers to the face of MFP 100 opposed to the user who uses MFP 100. Operation panel 300 is substantially plate-shaped in external shape. In MFP 100, operation panel 300 is installed such that a main face thereof is inclined with respect to a vertical direction. Operation panel 300 may also be provided with a mechanism for changing an angle of operation panel 300 in accordance with the user's state (for example, the user's height or the user sitting on a wheelchair).

Figure 5:
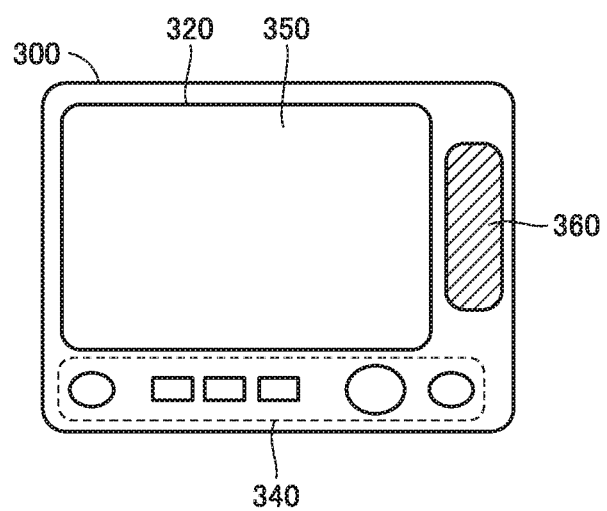
FIG. 5 is a diagram showing the configuration of an operation panel.

Referring to FIG. 5, the configuration of operation panel 300 will be described.

As shown in FIG. 5, operation panel 300 includes a key group 340 constituted of a plurality of keys, in addition to display 320 and touch sensor 350. Key group 340 includes keys for receiving input of various instructions from the user, and keys for receiving input of information such as numbers, letters, and symbols. More specifically, key group 340 includes a start key for initiating an operation such as copy/scan, a stop key for instructing to stop the copy/scan operation, and a reset key for canceling a set mode or job. Moreover, in MFP 100, display 320 displays an arrangement of software keys. A touch in a position corresponding to a software key displayed on display 320 on touch sensor 350 causes MFP 100 to execute an operation in accordance with the key corresponding to the touched position.

<Configuration of MFP>

Figure 6:
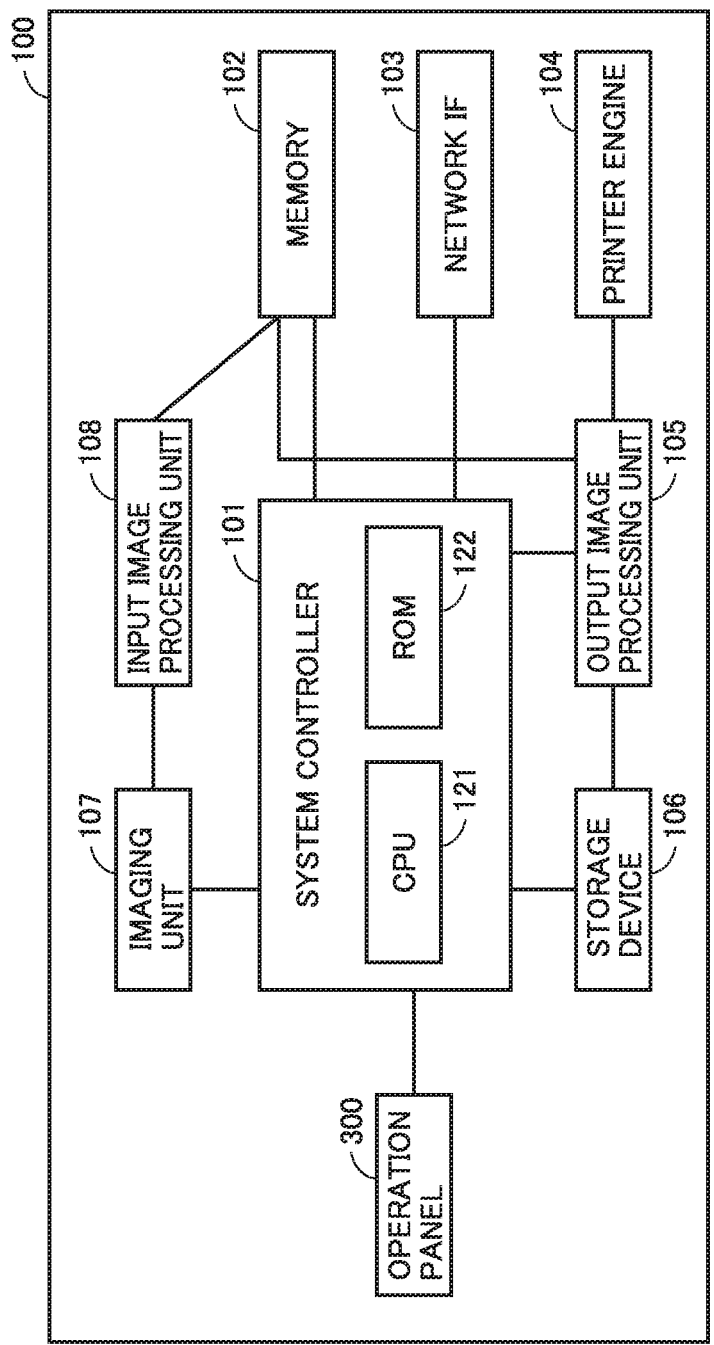
FIG. 6 is a block diagram showing the configuration of the MFP.

Referring to FIG. 6, MFP 100 includes a system controller 101, a memory 102, a network interface (I/F) 103, a printer engine 104, an output image processing unit 105, a storage device 106, an imaging unit 107, an input image processing unit 108, and operation panel 300. System controller 101 is connected, via an internal bus, for example, to memory 102, network interface 103, printer engine 104, output image processing unit 105, storage device 106, imaging unit 107, input image processing unit 108, and operation panel 300.

System controller 101 controls MFP 100 as a whole with respect to various jobs such as a scan job, a copy job, a mail transmission job, and a print job. System controller 101 includes a CPU (Central Processing Unit) 121 and a ROM (Read Only Memory) 122.

CPU 121 executes a control program stored in ROM 122. ROM 122 stores various programs for controlling the operation of MFP 100 and various types of fixed data. CPU 121 reads and writes data from and to memory 102 by performing prescribed processing.

Memory 102, which is a RAM (Random Access Memory), for example, is used for temporarily storing image data or data required for CPU 121 to execute a control program, for example.

Network interface 103 communicates with an external device over a network in accordance with an instruction from system controller 101.

Printer engine 104 performs print processing on paper or the like based on print data processed by output image processing unit 105. In particular, where MFP 100 operates as a printer, printer engine 104 prints an image, and where MFP 100 operates as a copying machine, printer engine 104 prints an image read by imaging unit 107.

Output image processing unit 105 executes, during printing of an image, for example, conversion processing for converting the data format of the image into the print data.

Storage device 106, which is a hard disk drive (HDD), for example, stores various types of data concerning the operation of MFP 100. Storage device 106 may also store image data for a screen to be displayed on operation panel 300 of MFP 100.

Imaging unit 107 reads an image of the document, and outputs the image to input image processing unit 108.

Input image processing unit 108 performs, when an image is read by imaging unit 107, conversion processing for converting the format of the image data.

The operation of MFP 100 as described herein is realized by CPU 121 executing an appropriate program in MFP 100. The program to be executed by CPU 121 may be stored in ROM 122 as described above, may be stored in storage device 106, or may be stored in a storage medium removable from MFP 100. Examples of the storage medium storing the program include media storing data in a non-volatile manner, such as a compact disk-read only memory (CD-ROM), a digital versatile disk-read only memory (DVD-ROM), an universal serial bus (USB) memory, a memory card, a flexible disk (FD), a hard disk, a solid state drive (SSD), a magnetic tape, a cassette tape, a magnetic optical disk (MO), the MiniDisc (MD), an integrated circuit (IC) card (excluding a memory card), an optical card, a mask ROM, an erasable programmable read-only memory (EPROM), and an electronically erasable programmable read-only memory (EEPROM).

Note that the program according to the present disclosure may invoke required ones of program modules provided as part of an operating system (OS) of a computer, in a prescribed arrangement and at prescribed timing, and cause the processing to be executed. In this case, the above-described modules are not included in the program itself, and the processing is executed in cooperation with the OS. Such a program not including modules may also be encompassed within the program according to the present invention.

Furthermore, the program according to the present invention may be provided as being incorporated into part of another program. Similarly in this case, modules included in the other program are not included in the program itself, and the processing is executed in cooperation with the other program. Such a program incorporated into the other program is also encompassed within the program according to the present invention.

A provided program product is installed onto a program storage unit such as a hard disk and executed. Note that the program product includes a program itself and a storage medium storing the program.

<Configuration of Operation Panel (Invalidation of Input to Partial Region)>

Figure 7:
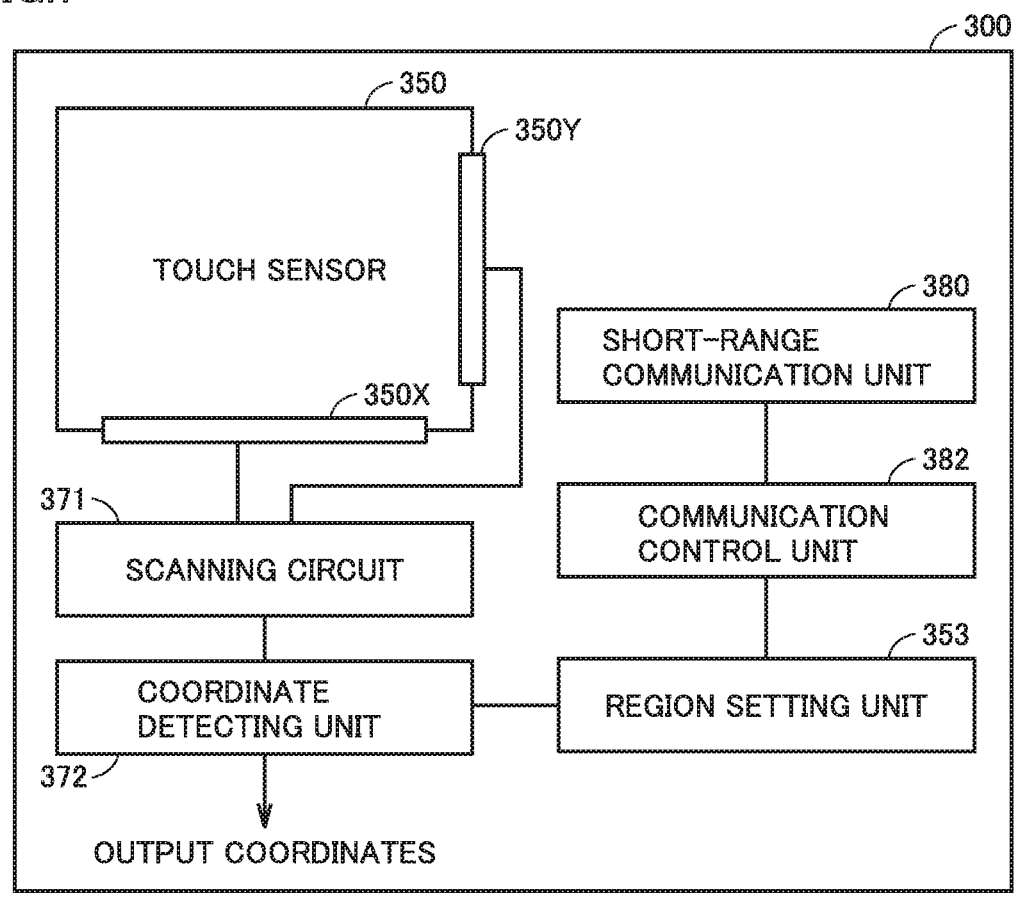
FIG. 7 is a diagram showing a configuration for invalidating input to a partial region of a touch sensor in the operation panel.

In MFP 100 according to the first embodiment, it is assumed that the terminal and the user's hand holding the terminal are present near operation panel 300, as shown in FIG. 2, while the communication over short-range wireless communication is being conducted. Thus, input to a part of touch sensor 350 (input invalidation region 351) in MFP 100 is invalidated, as shown in FIG. 3, while the communication over short-range wireless communication is being conducted. Referring to FIG. 7, a configuration for invalidating input to a part of touch sensor 350 in operation panel 300 will be hereinafter described.

Touch sensor 350 includes a plurality of electrodes arranged in a matrix form. In FIG. 7, electrodes arranged to extend in an X-axis direction of touch sensor 350 are shown as an X electrode group 350 X, and electrodes arranged to extend in a Y-axis direction are shown as a Y electrode group 350Y.

X electrode group 350X and Y electrode group 350Y are connected to a scanning circuit 371. Scanning circuit 371 successively scans voltage values of respective X electrode group 350X and Y electrode group 350Y to specify an amount of change in capacitance caused by a touch of an electrical conductor on the surface of touch sensor 350 of each of the electrodes. Scanning circuit 371 outputs the specified amount of change in capacitance to a coordinate detecting unit 372.

Coordinate detecting unit 372 specifies a touch position in touch sensor 350, based on the amount of change input from scanning circuit 371. Coordinate detecting unit 372 then outputs to a system controller 101 the presence of a touch operation in the specified touch position.

Coordinate detecting unit 372 is connected with a region setting unit 353. When the presence of an object such as the user's hand near touch area 360 is sensed, region setting unit 353 sets a region of touch sensor 350 where touch input is to be invalidated, as described with reference to FIG. 3.

Operation panel 300 includes a short-range communication unit 380 and a communication control unit 382 for transmitting and receiving information over short-range wireless communication. Communication control unit 382 is implemented by a communication circuit for short-range wireless communication, for example. Short-range communication unit 380 is implemented by an antenna for short-range wireless communication, for example. Communication control unit 382 converts radio waves received by short-range communication unit 380 into a signal, and transmits the signal to system controller 101. Communication control unit 382 also notifies region setting unit 353 that short-range communication unit 380 has received the radio waves.

Region setting unit 353, upon reception of such a notification from communication control unit 382, outputs an instruction to coordinate detecting unit 372 for invalidating the input to a partial region (input invalidation region 351 in FIG. 3) in touch sensor 350. Thus, when the touch position specified based on the amount of change input from scanning circuit 371 is within input invalidation region 351, region setting unit 353 does not output the presence of a touch operation in that touch position to system controller 101. Thus, even if a touch operation is present in that touch position, an operation corresponding to that touch operation is not executed in MFP 100. That is, the touch operation is invalidated.

In the configuration described above with reference to FIG. 7, a touch in input invalidation region 351 is invalidated because even if the touch is detected in input invalidation region 351, region setting unit 353 does not output such a detection output to system controller 101. Note that when touch sensor 350 is constituted of a plurality of sensors arranged in a matrix form, a touch in input invalidation region 351 may be invalidated if those of the plurality of sensors arranged in input invalidation region 351 are made not to detect such a touch.

<Hardware Configuration of Mobile Terminal>

Figure 8:
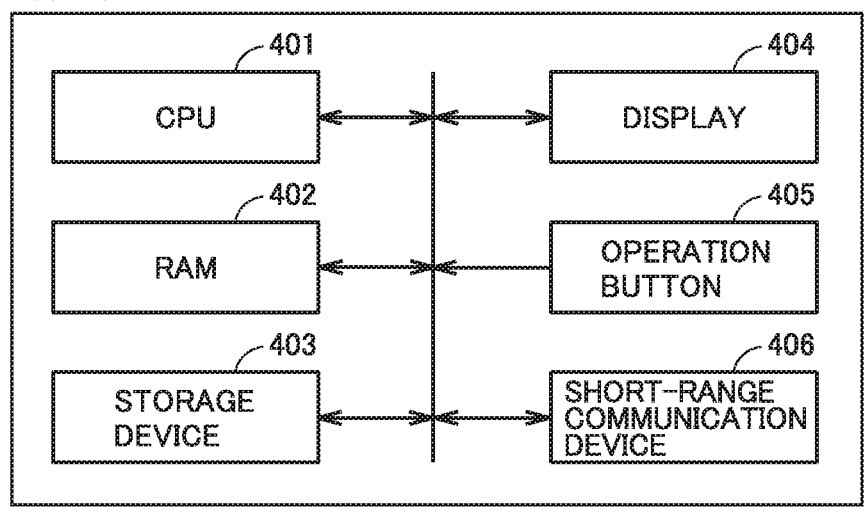
FIG. 8 is a diagram showing an exemplary hardware configuration of a mobile terminal, which is one example with which the MFP communicates over short-range wireless communication.

Referring to FIG. 8, an exemplary hardware configuration of mobile terminal 400, which is one example with which MFP 100 communicates over short-range wireless communication, will be described.

Mobile terminal 400 includes, as main components, a CPU 401, a RAM 402, a storage device 403, a display 404, an operation button 405, and a short-range communication device 406. CPU 401, RAM 402, storage device 403, display 404, operation button 405, and short-range communication device 406 are connected to one another with an internal bus.

CPU 401 is an exemplary arithmetic unit that executes processing for controlling overall operation of mobile terminal 400.

RAM 402 serves as a work area during the execution of processing by CPU 401.

Storage device 403 stores data of various programs such as OS programs and application programs executed by CPU 401, as well as data used for the execution of these programs. Examples of storage device 403 may include media storing data in a non-volatile manner, such as an EEPROM. A program downloaded over the network may also be installed onto storage device 403.

Display 404 is a display device for displaying an image representing a result of processing by a program executed by CPU 401.

Operation button 405 is an exemplary input device through which information is input to mobile terminal 400, such as an instruction concerning the processing of a running application. Note that a touch sensor provided on display 404 may be mentioned as another example of the input device included in mobile terminal 400.

Short-range communication device 406 is an exemplary communication device for communicating information with an external device such as MFP 100 in accordance with a standard, for example, NFC.

<Flow of Processing>

Figure 9:
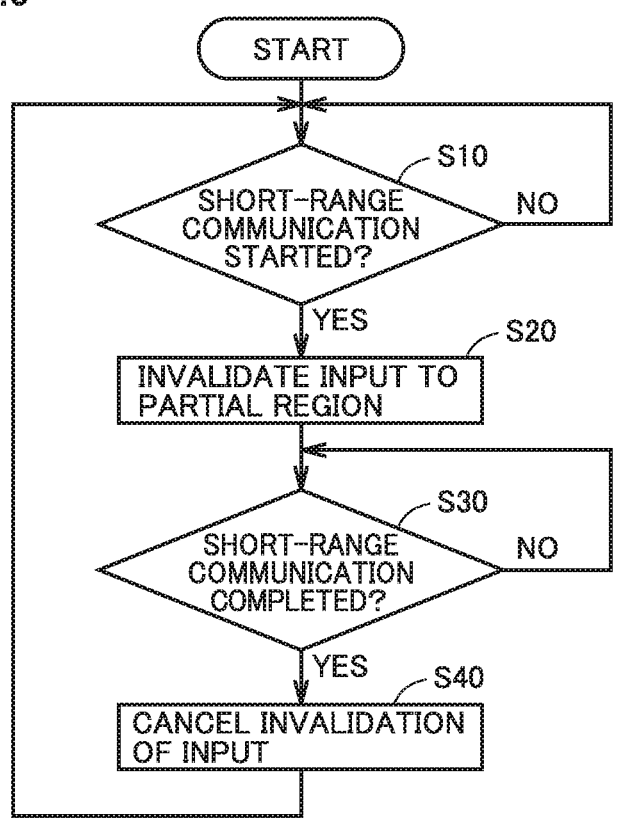
FIG. 9 is a flowchart of processing executed by the MFP for switching the input to a partial region of the touch sensor to be valid/invalid.

FIG. 9 is a flowchart of processing executed by CPU 121 of MFP 100 for switching the input to a partial region of touch sensor 350 to be valid/invalid. The processing shown in FIG. 9 is executed, for example, during the reception of the input to touch sensor 350 in MFP 100.

Referring to FIG. 9, in step S10, CPU 121 determines whether or not communication control unit 382 has started short-range wireless communication with a terminal such as mobile terminal 400. Where CPU 121 determines that communication control unit 382 has not started short-range wireless communication yet (NO in step S10), the control remains in step S10. Where CPU 121 determines that communication control unit 382 has started short-range wireless communication (YES in step S10), the control proceeds to step S20.

In step S20, CPU 121 executes control for invalidating input to a partial region of touch sensor 350. To execute this control, as described with reference to FIG. 7, for example, CPU 121 causes region setting unit 353 to output an instruction to coordinate detecting unit 372 for invalidating the input to input invalidation region 351 (FIG. 3). The control then proceeds to step S30.

In step S30, CPU 121 determines whether or not communication control unit 382 has completed short-range wireless communication. The control remains in the control in step S30 until CPU 121 determines that communication control unit 382 has completed short-range wireless communication (NO in step S30). Where CPU 121 determines that communication control unit 382 has completed short-range wireless communication (YES in step S30), the control proceeds to step S40.

In step S40, CPU 121 cancels the invalidation of the input made in step S120. That is, CPU 121 causes region setting unit 353 to instruct coordinate detecting unit 372 to cancel the invalidation of the input to input invalidation region 351 (FIG. 3). Thus, if a touch operation is made in the region shown as input invalidation region 351 of touch sensor 350, coordinate detecting unit 372 outputs to system controller 101 coordinates where the touch operation was made. The control is then returned to step S10.

In MFP 100 according to the first embodiment described above, even if a touch operation is made in input invalidation region 351 during communication over short-range wireless communication, input by the touch operation is not received. In this way, even if the user unintentionally contacts input invalidation region 351 when he/she is bringing mobile terminal 400 closer to touch area 360, operation of MFP 100 in response to such an unintentional contact is avoided.

Second Embodiment

<Configuration of Operation Panel>

Figure 10:
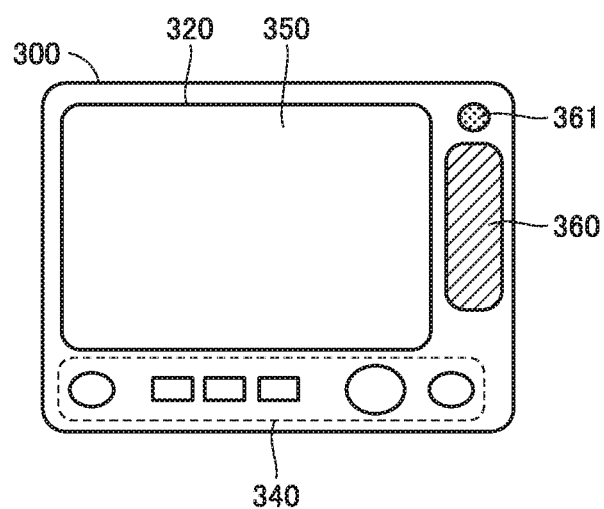
FIG. 10 is a plan view of an operation panel of an MFP according to a second embodiment.

FIG. 10 is a plan view of operation panel 300 of MFP 100 according to a second embodiment. As shown in FIG. 10, MFP 100 according to the second embodiment further includes a sensing unit 361 for detecting the presence of an object near touch area 360. Sensing unit 361 is a proximity sensor that contactlessly senses the presence of an object. Sensing unit 361 may be any type of sensor (including an induction type, a capacitance type, and a magnetic type) capable of contactlessly detecting the presence of an object.

Figure 11:
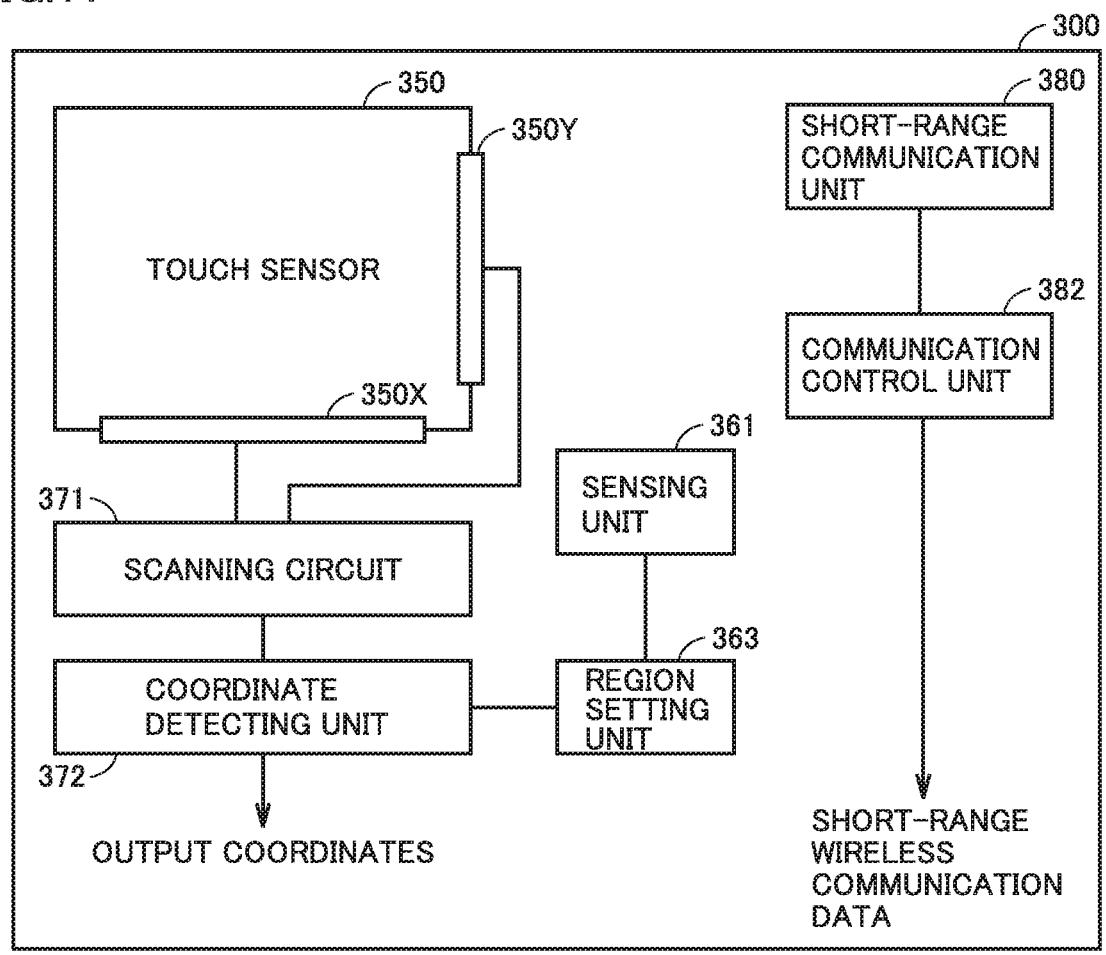
FIG. 11 is a diagram showing a configuration for invalidating input to a partial region of a touch sensor in the operation panel according to the second embodiment.

FIG. 11 is a diagram showing a configuration for invalidating input to a partial region of touch sensor 350 in operation panel 300 according to the second embodiment. As shown in FIG. 11, in operation panel 300 according to the second embodiment, sensing unit 361, instead of communication control unit 382, is connected to region setting unit 353.

In the second embodiment, when sensing unit 361 detects the presence of an object, it notifies the presence of the object to region setting unit 363. In response to this, region setting unit 363 outputs an instruction to coordinate detecting unit 372 for invalidating input to input invalidation region 351 (FIG. 3).

Furthermore, in the second embodiment, when sensing unit 361 has detected that the object is no longer present, region setting unit 363 is notified of this absence of the object. In response to this, region setting unit 363 stops instructing coordinate detecting unit 372 to invalidate the input to input invalidation region 351.

As described above, in the second embodiment, input to input invalidation region 351 is invalidated while sensing unit 361 is detecting the presence of an object. Once sensing unit 361 has finished detecting the presence of the object, the invalidation of the input to input invalidation region 351 is canceled, so that the input to input invalidation region 351 can then be received.

<Flow of Processing>

Figure 12:
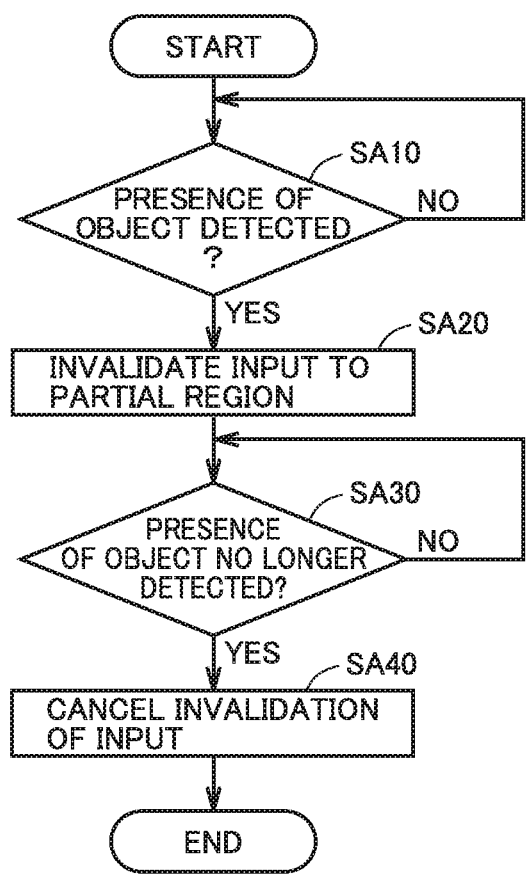
FIG. 12 is a flowchart of processing executed by the MFP according to the second embodiment.

FIG. 12 is a flowchart of processing executed by CPU 101 of MFP 100 according to the second embodiment. This processing is executed during a period of time in which a touch operation is received by touch sensor 350.

Referring to FIG. 12, in step SA10, CPU 101 determines whether or not sensing unit 361 has detected the presence of an object. Where CPU 101 determines that sensing unit 361 has not detected the presence of an object (NO in step SA10), the control remains in step SA10. On the other hand, where CPU 101 determines that sensing unit 361 is detecting the presence of an object (YES in step SA10), the control proceeds to step SA20.

In step SA20, CPU 101 causes region setting unit 353 to transmit an instruction to coordinate detecting unit 372 for invalidating input to a certain region (input invalidation region 351 (FIG. 3)). The control then proceeds to step SA30.

In step SA30, CPU 101 determines whether or not sensing unit 361 has detected that the object is no longer present, that is, whether or not sensing unit 361 is no longer detecting the presence of the object. Where CPU 101 determines that sensing unit 361 is still detecting the presence of the object (NO in step SA30), the control remains in step SA30. On the other hand, where CPU 101 determines that sensing unit 361 has detected that the object is no longer present (YES in step SA30), the control proceeds to step SA40.

In step SA40, CPU 101 causes region setting unit 363 to transmit an instruction to coordinate detecting unit 372 for cancelling the invalidation of the input to the certain region (input invalidation region 351). The control is then returned to step SA10.

In MFP 100 according to the second embodiment as described above, even if a touch operation is made in input invalidation region 351 during a period of time in which sensing unit 361 is detecting the proximity of an object, input by that touch operation is not received. Sensing unit 361 is placed near touch area 360. In this way, even if the user has unintentionally contacted input invalidation region 351 when he/she is bringing mobile terminal 400 closer to touch area 360, operation of MFP 100 in response to such an unintentional contact is avoided.

Third Embodiment

In MFP 100 according to a third embodiment, sensing unit 361 is provided in operation panel 300, as in MFP 100 according to the second embodiment. Note that in the third embodiment, although input to a certain region of touch sensor 350 is invalidated when sensing unit 361 has detected the presence of an object, the invalidation of the input is canceled if MFP 100 does not subsequently start short-range wireless communication with an external terminal within a certain time (1 minute, for example).

Figure 13:
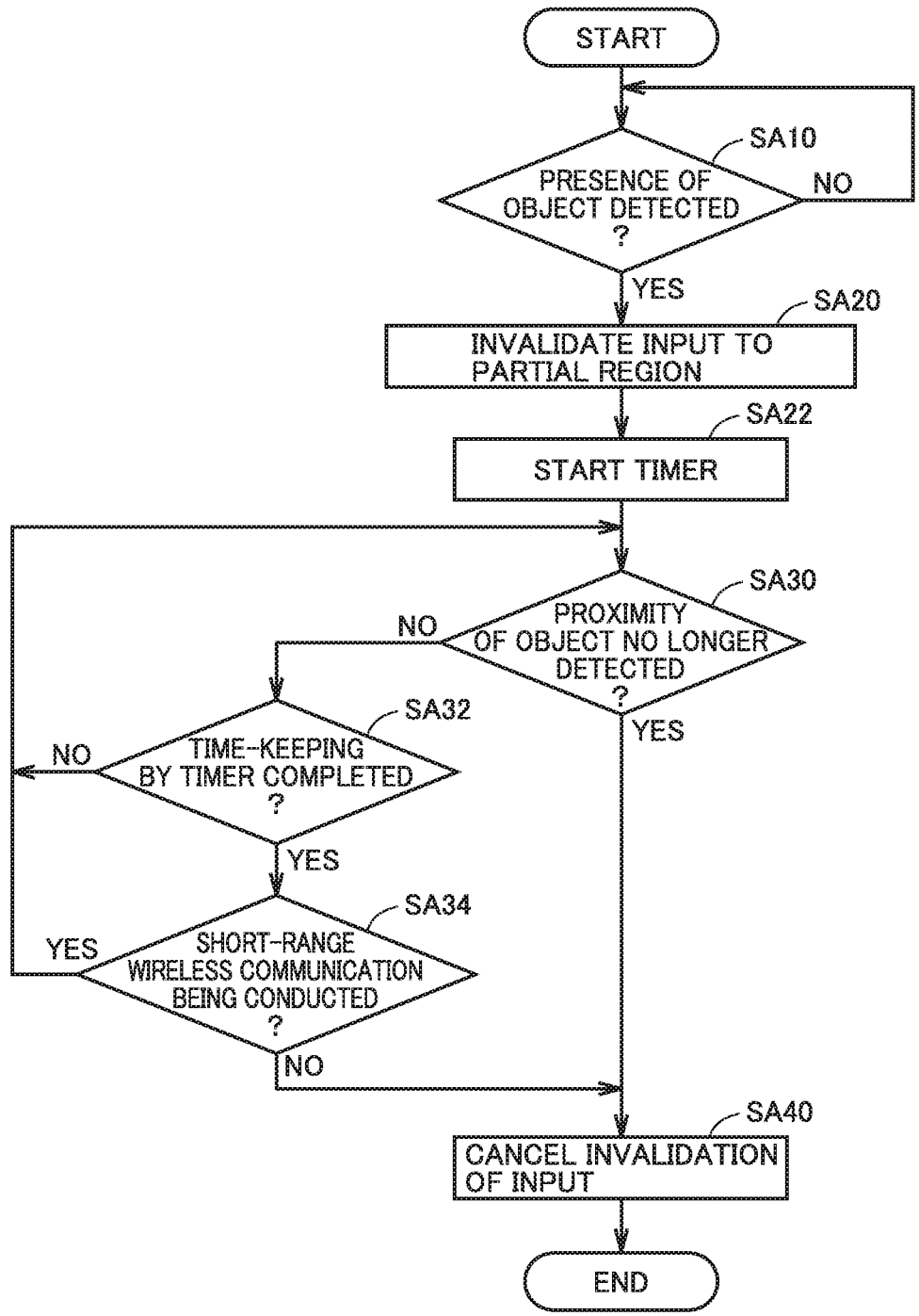
FIG. 13 is a flowchart of processing executed by the MFP according to the third embodiment.

FIG. 13 is a flowchart of processing executed by MFP 100 according to the third embodiment. As shown in FIG. 13, in steps SA10 and SA20, CPU 101 executes control similar to that according to the second embodiment. That is, where CPU 101 determines in step SA10 that sensing unit 361 has detected the presence of an object (YES in step SA10), the control proceeds to step SA20. CPU 101 then invalidates the input to a certain region (input invalidation region 351) in step SA20. The control then proceeds to step SA22.

In step SA22, CPU 101 causes a timer to start keeping time for counting the "certain time" described above. The control then proceeds to step SA30.

In step SA30, CPU 101 determines whether or not sensing unit 361 has detected that the object is no longer present. Where CPU 101 determines that the presence of the object is still being detected (NO in step SA30), the control proceeds to step SA32. Where CPU 101 determines that the object is no longer detected (YES in step SA30), the control proceeds to step SA40.

In step SA32, CPU 101 determines whether or not time-keeping by the timer started in step S22 is completed. Where CPU 101 determines that time-keeping is still ongoing (NO in step SA32), the control is returned to step SA30. On the other hand, where CPU 101 determines that time-keeping is completed (YES in step SA32), the control proceeds to step S34.

In step SA34, CPU 101 determines whether or not short-range wireless communication is being conducted by communication control unit 382 in MFP 100. Where CPU 101 determines that short-range wireless communication is being conducted (YES in step SA34), the control is returned to step SA30. On the other hand, where CPU 101 determines that short-range wireless communication is not being conducted (NO in step SA34), the control proceeds to step SA40.

In step SA40, CPU 101 causes the invalidation of the input to the certain region made in step SA20 to be canceled, and the control is returned to step SA10.

In the third embodiment described above, where sensing unit 361 has detected that an object is no longer present after detecting the presence of the object (YES in step SA30), or where communication over short-range wireless communication is not started within a certain time or short-range wireless communication is completed within a certain time (NO in step SA34), the invalidation of input to a certain region (input invalidation region 351 (FIG. 3)) of touch sensor 350 is canceled.

Where communication over short-range wireless communication is not started within a certain time after the presence of an object is detected by sensing unit 361, the detected approach of the object to sensing unit 361 is very unlikely to be due to the user's hand waving the terminal over touch area 360. In this case, in MFP 100 according to the third embodiment, any inconvenience that may be caused by the invalidation of input to a partial region of touch sensor 350 can be avoided.

Fourth Embodiment

<Summary>

In a fourth embodiment, the region of touch sensor 350 where input is to be invalidated is changed in accordance with the position of an object that has approached MFP 100.

More specifically, in the fourth embodiment, operation panel 300 is provided with a plurality of sensing units near touch sensor 350 and touch area 360. Note that the plurality of sensing units are arranged such that they can detect the presence of an object in positions at distances from touch sensor 350 different from one another. This allows different positions of the object on touch sensor 350 to be identified based on respective outputs from the plurality of sensing units, in MFP 100 according to the fourth embodiment. The region of touch sensor 350 where input is to be invalidated is then changed based on the positions of the object.

<External Appearance of Operation Panel>

Referring to FIGS. 14 to 17, detection of an object near touch area 360 in MFP 100 according to the fourth embodiment will be described.

Figure 14:
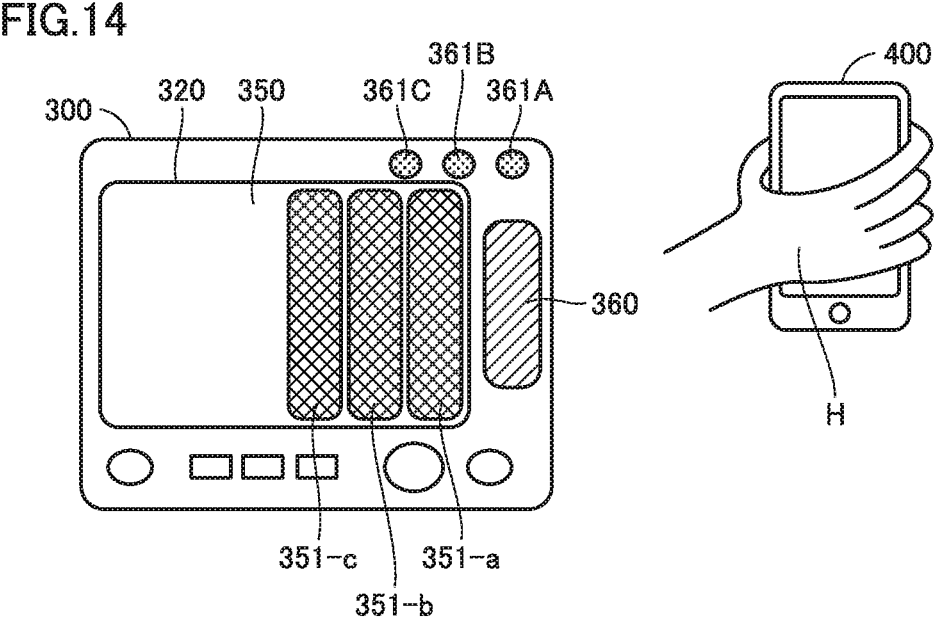
FIG. 14 is a diagram for use in explaining detection of the presence of an object near a touch area in an MFP according to a fourth embodiment.

First, as shown in FIG. 14, operation panel 300 according to the fourth embodiment is provided with three sensing units 361A, 361B, and 361C near touch sensor 350 and touch area 360. Sensing units 361A, 361B, and 361C are arranged side by side in a horizontal direction, as shown in FIG. 14. Of sensing units 361A, 361B, and 361C, sensing unit 361A is located on the rightmost side, while sensing unit 361C is located on the leftmost side. Moreover, of sensing units 361A, 361B, and 361C, sensing unit 361A is the most distant from the center of touch sensor 350, while sensing unit 361C is the closest to the center of touch sensor 350.

Three input invalidation regions 351-a, 351-b, and 351-c are shown in FIG. 14. Of input invalidation regions 351-a, 351-b, and 351-c, input invalidation region 351-a is the most distant from the center of touch sensor 350, while input invalidation region 351-c is the closest to the center of touch sensor 350.

Figure 15:
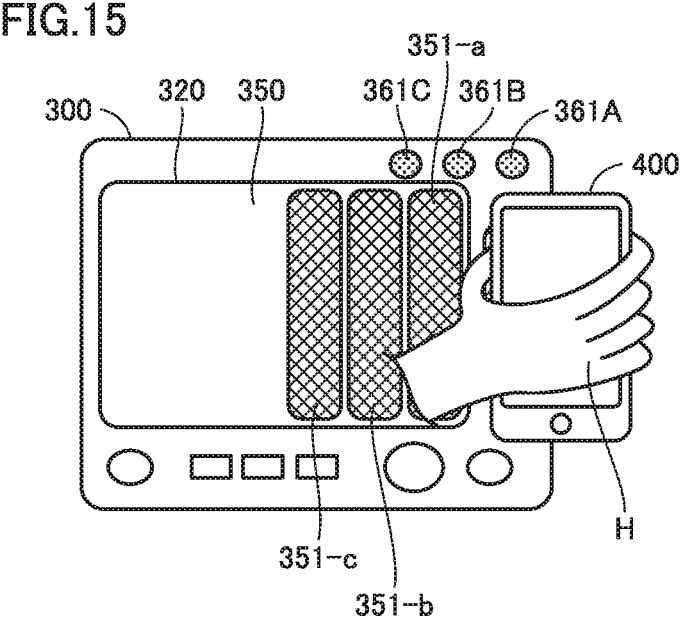
FIG. 15 is a diagram showing a state in which only one of three sensing units is detecting the presence of the object in the MFP according to the fourth embodiment.
Figure 16:
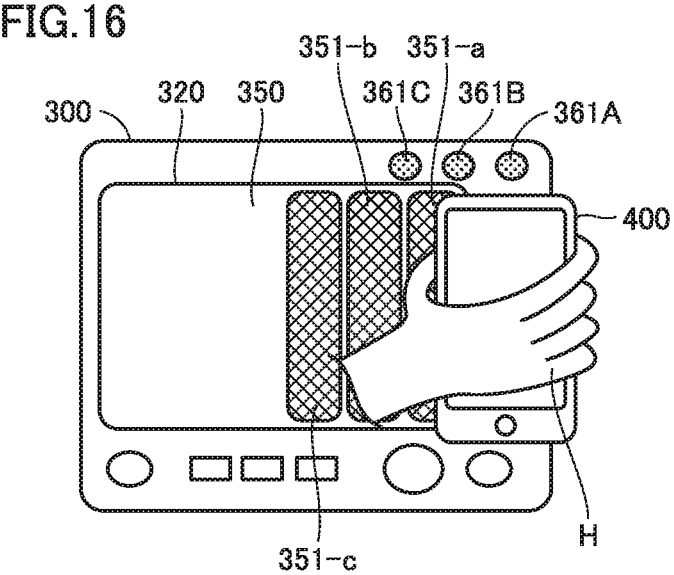
FIG. 16 is a diagram showing a state in which two of the three sensing units are detecting the presence of the object in the MFP according to the fourth embodiment.
Figure 17:
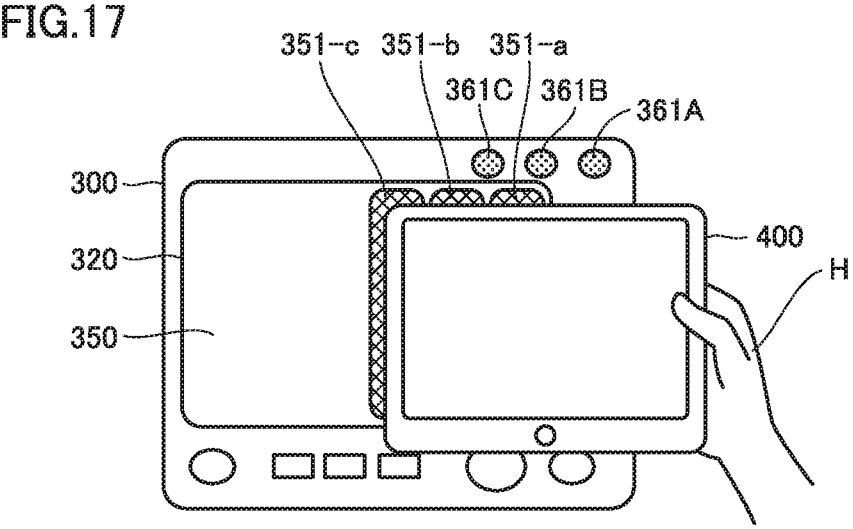
FIG. 17 is a diagram showing a state in which all of the three sensing units are detecting the presence of the object in the MFP according to the fourth embodiment.

FIG. 15 shows a state in which only sensing unit 361A of sensing units 361A, 361B, and 361C is detecting the presence of an object. FIG. 16 shows a state in which sensing units 361A and 361B of sensing units 361A, 361B, and 361C are detecting the presence of an object. FIG. 17 shows a state in which all of sensing units 361A, 361B, and 361C are detecting the presence of an object.

Of FIGS. 15 to 17, it is in FIG. 15 that mobile terminal 400 is located the most distant from the center of touch sensor 350. In the state shown in FIG. 15, only sensing unit 361A detects the presence of the object. In this state, input is invalidated only in input invalidation region 351-a of input invalidation regions 351-a, 351-b, and 351-c.

In FIG. 16, mobile terminal 400 is closer to the center of touch sensor 350 than in the state shown in FIG. 15. In the state shown in FIG. 16, sensing units 361A and 361B detect the presence of the object. In this state, input is invalidated in input invalidation regions 351-a and 351-b of input invalidation regions 351-a, 351-b, and 351-c.

In FIG. 17, mobile terminal 400 is even closer to the center of touch sensor 350 than in the state shown in FIG. 16. In the state shown in FIG. 16, sensing units 361A and 361B detect the presence of the object. In this state, input is invalidated in all of input invalidation regions 351-a, 351-b, and 351-c.

<Configuration of Operation Panel>

Figure 18:
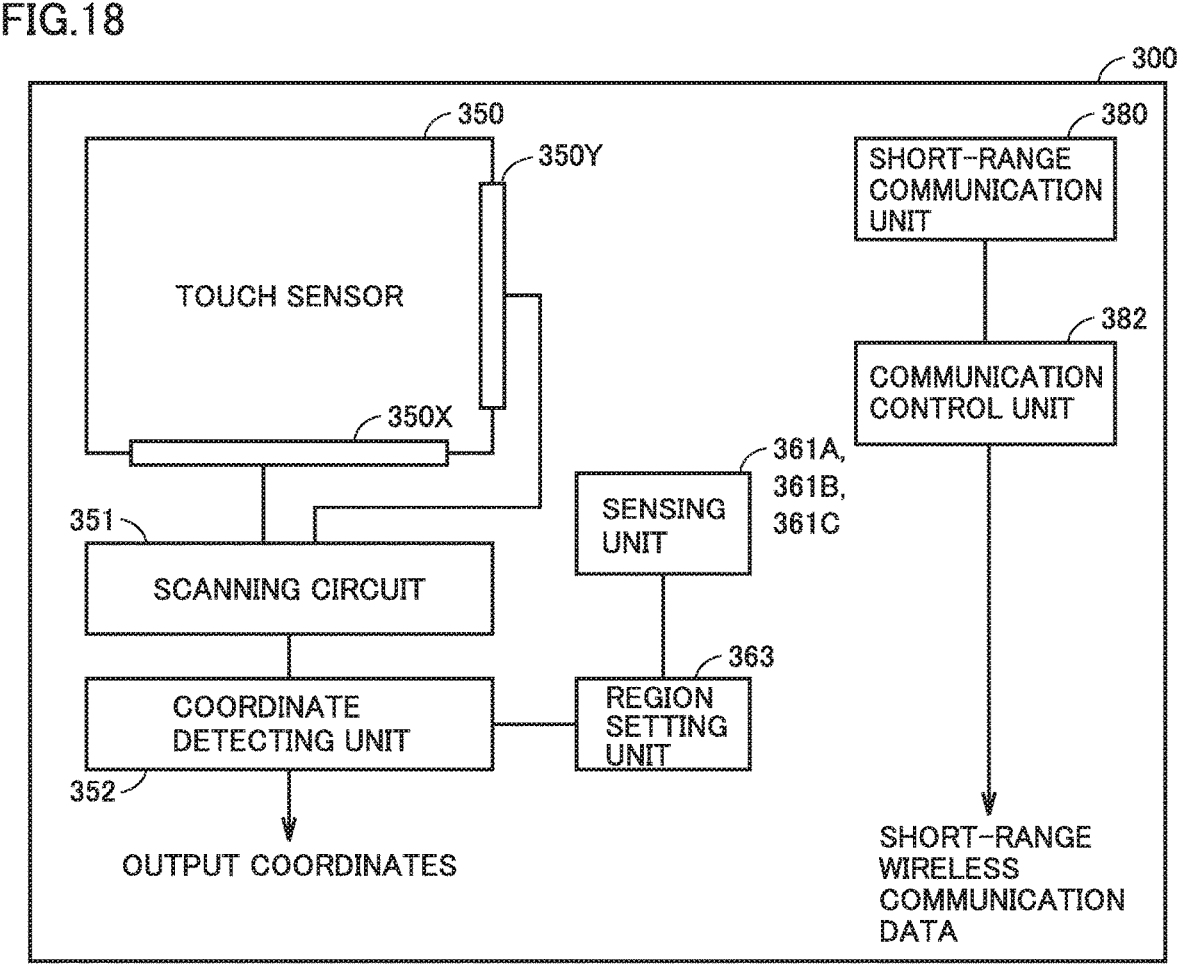
FIG. 18 is a diagram showing a configuration for invalidating input to a partial region of a touch sensor in the operation panel of the MFP according to the fourth embodiment.

FIG. 18 is a diagram showing a configuration for invalidating input to a partial region of touch sensor 350 in operation panel 300 of MFP 100 according to the fourth embodiment.

Referring to FIG. 18, operation panel 300 according to the fourth embodiment includes sensing units 361A, 361B, and 361C instead of sensing unit 361, as compared to the structure shown in FIG. 11. Upon detection of the presence of an object, each of sensing units 361A, 361B, and 361C notifies the detection to region setting unit 363.

Upon reception of the notification from sensing unit 361A that the object has been detected, region setting unit 363 instructs coordinate detecting unit 372 to invalidate input to input invalidation region 351-a. Upon reception of the notification from sensing unit 361B that the object has been detected, region setting unit 363 instructs coordinate detecting unit 372 to invalidate input to input invalidation region 351-b. Upon reception of the notification from sensing unit 361C that the object has been detected, region setting unit 363 instructs coordinate detecting unit 372 to invalidate input to input invalidation region 351-c.

<Flow of Processing>

Figure 19:
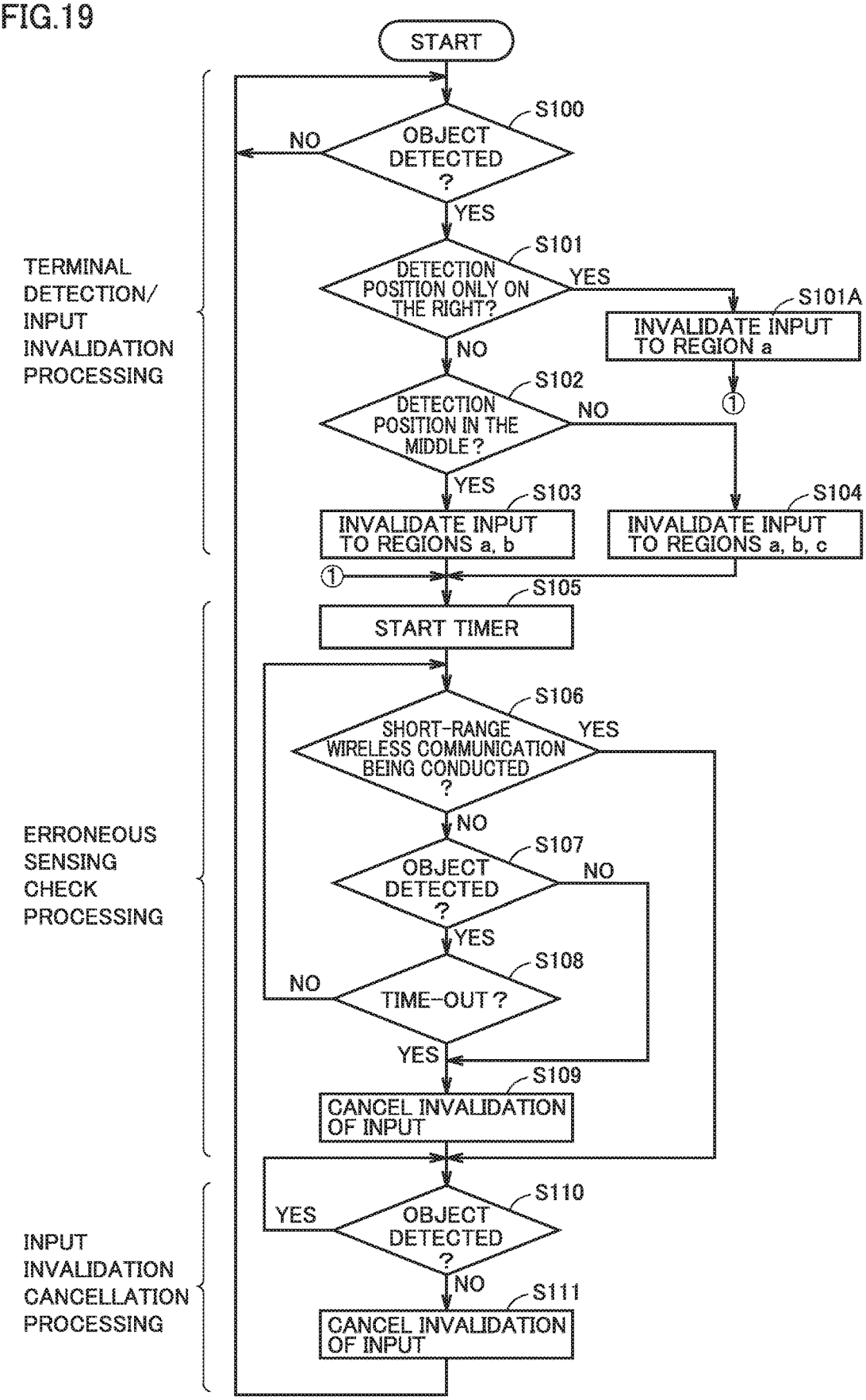
FIG. 19 is a flowchart of processing executed by the MFP according to the fourth embodiment for invalidating input based on the detection of the object.

FIG. 19 is a flowchart of processing executed by CPU 101 of MFP 100 according to the fourth embodiment for invalidating input based on the detection of the object. In MFP 100 according to the fourth embodiment, the region of touch sensor 350 where input is to be invalidated is changed based on the position of the object identified using a detection output from any of the three sensing units. Moreover, in MFP 100 according to the fourth embodiment, the invalidation of the input is canceled if communication over short-range wireless communication is not started within a certain time after the presence of the object is detected by any of the sensing units, as in the third embodiment.

Referring to FIG. 19, in step S100, CPU 101 determines whether or not any of sensing units 361A to 361C has detected the presence of an object. Where CPU 101 determines that none of the sensing units have detected the presence of an object (NO in step S100), the control remains in step S100. On the other hand, where CPU 101 determines that any of sensing units 361A to 361C is detecting the presence of an object (YES in step S100), the control proceeds to step S101.

In step S101, CPU 101 determines whether or not the sensing unit that has detected the presence of the object is only the right-hand one (sensing unit 361A). Where CPU 101 determines that only the right-hand sensing unit has detected the presence of the object (YES in step S101), the control proceeds to step S101A. On the other hand, where CPU 101 determines that a sensing unit other than the right-hand sensing unit is also detecting the presence of the object (NO in step S101), the control proceeds to step S102.

In step S101A, CPU 101 invalidates input to input invalidation region 351-a. The invalidation of the input to input invalidation region 351-a is realized, for example, by instructing coordinate detecting unit 372 to invalidate a touch operation sensed in the region. The control then proceeds to step S105.

In step S102, CPU 101 determines whether or not not only the right-hand sensing unit (sensing unit 361A) but also the central sensing unit (sensing unit 361B) have detected the presence of the object. Where CPU 101 determines that the right-hand sensing unit and the central sensing unit have detected the presence of the object (YES in step S102), the control proceeds to step S103. On the other hand, where CPU 101 determines that sensing units that have detected the presence of the object are not only the right-hand sensing unit and the central sensing unit (NO in step S102), the control proceeds to step S104.

In step S103, CPU 101 invalidates input to input invalidation regions 351-a and 351-b. The invalidation of the input to input invalidation regions 351-a and 351-b is realized, for example, by instructing coordinate detecting unit 372 to invalidate a touch operation sensed in these regions. The control then proceeds to step S105.

In step S104, CPU 101 invalidates input to the three input invalidation regions 351-a to 351-c. The invalidation of the input to input invalidation regions 351-a to 351-c is realized, for example, by instructing coordinate detecting unit 372 to invalidate a touch operation sensed in these regions. The control then proceeds to step S105.

In step S105, CPU 101 causes a timer to start keeping time for counting the "certain time" described above. The control then proceeds to step S106.

In step S106, CPU 101 determines whether or not short-range wireless communication is being conducted by MFP 100. Where CPU 101 determines that short-range wireless communication is being conducted (YES in step S106), the control proceeds to step S110. On the other hand, where CPU 101 determines that short-range wireless communication is not being conducted (NO in step S106), the control proceeds to step S107.

In step S107, CPU 101 determines whether or not any of sensing units 361A to 361C is detecting the presence of an object. Where CPU 101 determines that any of sensing units 361A to 361C is detecting the presence of an object (YES in step S107), the control proceeds to step S108. On the other hand, where CPU 101 determines that none of sensing units 361A to 361C are detecting the presence of an object (NO in step S107), the control proceeds to step S109.

In step S108, CPU 101 determines whether or not time-keeping by the timer started in step S105 is completed. Where CPU 101 determines that time-keeping is still ongoing (NO in step S108), the control is returned to step S106. On the other hand, where CPU 101 determines that time-keeping is completed (YES in step S108), the control proceeds to step S109.

In step S109, CPU 101 cancels the invalidation of the input made in steps S101A, S103, and S104. That is, in step S109, CPU 101 cancels the instruction to coordinate detecting unit 372 for invalidating the touch operation. The control then proceeds to step S110.

In step S110, CPU 101 determines whether or not any of sensing units 361A to 361C is detecting the presence of an object. Where CPU 101 determines that any of sensing units 361A to 361C is detecting the presence of an object (YES in step S110), the control remains in step S110. On the other hand, where CPU 101 determines that none of sensing units 361A to 361C are detecting the presence of an object (NO in step S110), the control proceeds to step S111.

In step S111, CPU 101 cancels the invalidation of the input made in steps S101A, S103, and S104. That is, in step S109, CPU 101 cancels the instruction to coordinate detecting unit 372 for invalidating the touch operation. The control is then returned to step S100.

In the processing in FIG. 19 described above, the control from steps S100 to S104 corresponds to the invalidation of the input in response to the presence of an object near touch sensor 350. The control from steps S105 to S109 corresponds to the cancellation of the invalidation of the input when short-range wireless communication is not started within a certain time from the invalidation of the input. The control from steps S110 to S111 corresponds to the cancellation of the invalidation of the input in response to detecting that the object near touch sensor 350 is no longer present.

Fifth Embodiment

<Summary>

MFP 100 according to a fifth embodiment may be identical in hardware configuration to any of MFPs 100 according to the first to fourth embodiments. In MFP 100 according to the fifth embodiment, even if the presence of an object is detected near touch area 360, it is determined whether or not input to a partial region of touch sensor 350 is to be invalidated based on a content displayed in display 320.

More specifically, in MFP 100 according to the fifth embodiment, the control for invalidating the input as described above is executed when a screen displayed on display 320 is a screen for receiving input of information concerning control related to short-range wireless communication (that is, a screen linked to short-range wireless communication). On the other hand, the control for invalidating the input as described above is not executed when the screen displayed on display 320 is a screen not directly related to input of information concerning control related to short-range wireless communication (that is, a screen not linked to short-range wireless communication).

<Screen not Linked to Short-Range Wireless Communication>

Figure 20:
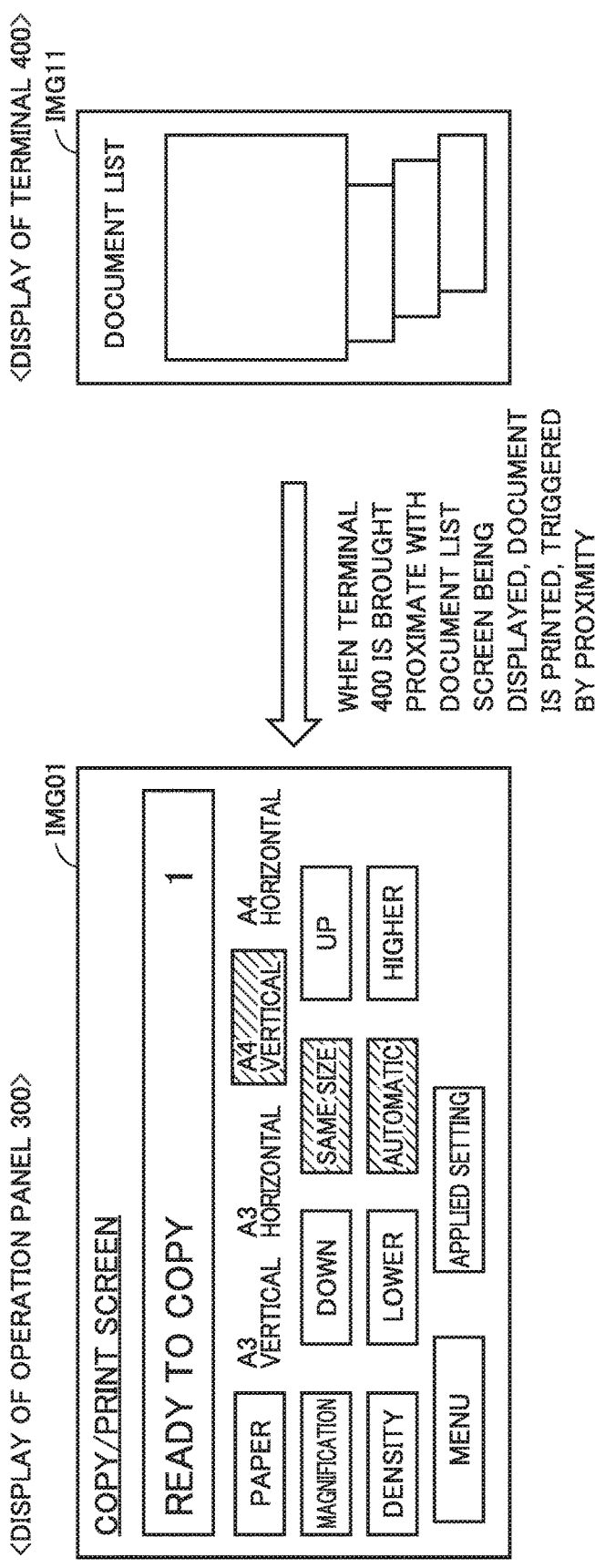
FIG. 20 is a diagram for use in explaining an exemplary screen displayed on a display of an operation panel of an MFP according to a fifth embodiment.

FIG. 20 is a diagram for use in explaining an exemplary screen not linked to short-range wireless communication, which is displayed on display 320 of operation panel 300 of MFP 100. Even if the presence of an object is detected near touch area 360, when the screen displayed on display 320 is a screen not linked to short-range wireless communication, CPU 101 of MFP 100 does not execute the processing for invalidating input to a partial region of touch sensor 350 as described with reference to FIGS. 9, 12, 13, 19, and the like.

In FIG. 20, an exemplary screen displayed on display 320 of operation panel 300 is shown as an image IMG01. An exemplary screen displayed on display 404 (FIG. 8) of mobile terminal 400 that is conducting short-range wireless communication with MFP 100 is shown as an image IMG11.

Image IMG01 on the MFP 100 (operation panel 300) side is a screen for receiving input of copy settings when MFP 100 is caused to execute a copy operation. On the other hand, image IMG11 on the mobile terminal 400 side is a screen for instructing print output of a document selected on the mobile terminal 400 side. In the example shown in FIG. 20, when an instruction for print output of the document selected in mobile terminal 400 is transmitted from mobile terminal 400 to MFP 100 over short-range wireless communication, the document is print output in MFP 100 without receiving the input of settings for the print output. That is, image IMG01 on the MFP 100 side does not indicate information for input of settings for print output of the document selected in mobile terminal 400.

Thus, in the example shown in FIG. 20, even if the presence of an object near touch area 360 is detected because of mobile terminal 400 or the user's hand holding mobile terminal 400, input to any region of touch sensor 350 is not invalidated.

<Screen Linked to Short-Range Wireless Communication>

Figure 21:
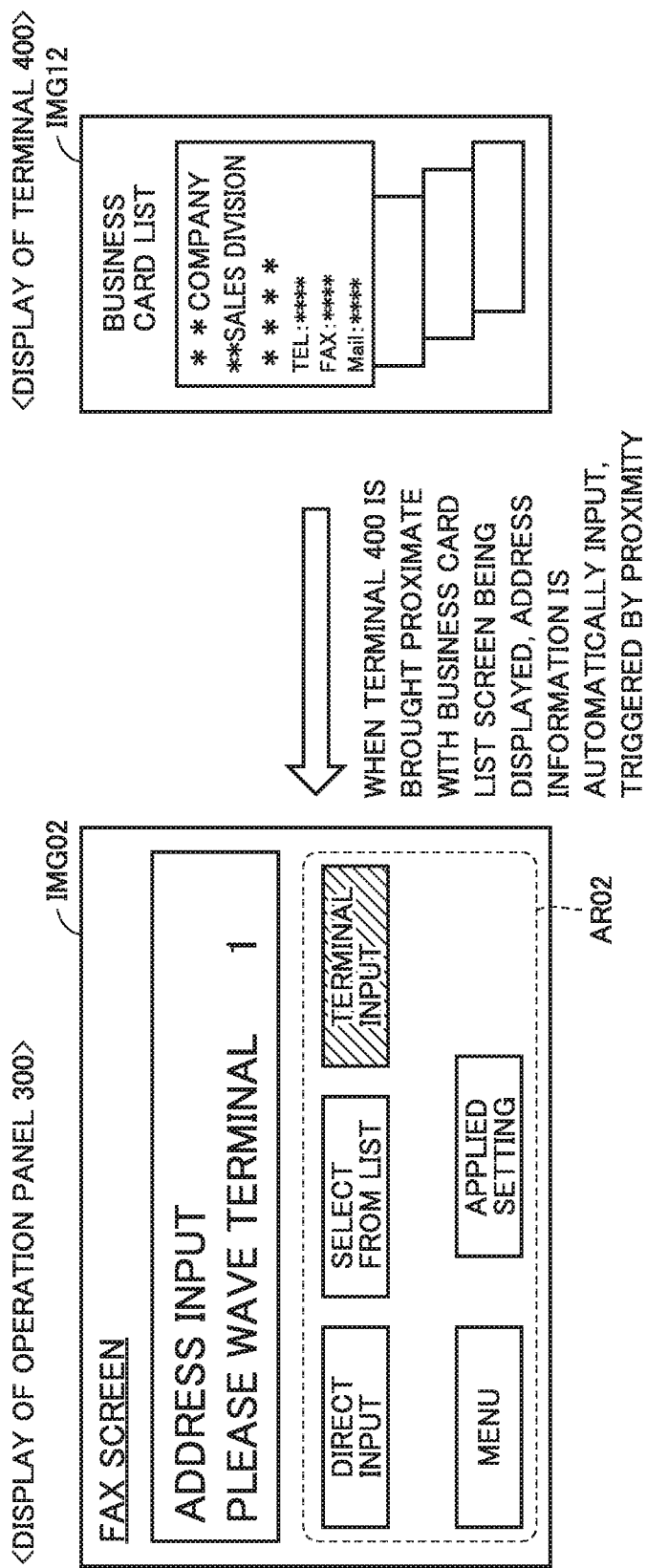
FIG. 21 is a diagram for use in explaining another exemplary screen displayed on the display of the operation panel of the MFP according to the fifth embodiment.

FIG. 21 is a diagram for use in explaining an exemplary screen linked to short-range wireless communication, which is displayed on display 320 of operation panel 300 of MFP 100. When the presence of an object is detected near touch area 360, CPU 101 of MFP 100 executes the processing for invalidating input to a partial region of touch sensor 350 as described with reference to FIGS. 9, 12, 13, 19, and the like, provided that the screen displayed on display 320 is a screen linked to short-range wireless communication.

In FIG. 21, an exemplary screen displayed on display 320 of operation panel 300 is shown as an image IMG02. An exemplary screen displayed on display 404 (FIG. 8) of mobile terminal 400 that is conducting short-range wireless communication with MFP 100 is shown as an image IMG12.

In the example shown in FIG. 21, image IMG12 on the mobile terminal 400 side is a screen for selection of a document to be transmitted to MFP 100 by facsimile communication. On the other hand, image IMG02 on the MFP 100 (operation panel 300) side is a screen for selection of an address to which the document selected in mobile terminal 400 is to be transmitted by facsimile communication. A region AR02 of image IMG02 displays five software keys for selection of three menus for designating a method of inputting the address ("DIRECT INPUT", "SELECT FROM LIST", and "TERMINAL INPUT") and two menus for designating settings for transmission of the document ("MENU" and "APPLIED SETTING"). That is, image IMG02 is a screen linked to short-range wireless communication with mobile terminal 400 by including these five software keys.

When information specifying the selected document and an instruction for facsimile transmission of the document are transmitted from mobile terminal 400 to MFP 100 over short-range wireless communication, CPU 101 of MFP 100 causes display 320 to display a screen for input of the address for facsimile transmission, as shown in image IMG02. Note that during short-range wireless communication of mobile terminal 400 with MFP 100, the presence of the object is detected near touch area 360. While the presence of the object is being detected near touch area 360, CPU 101 executes the control for invalidating a touch operation to an input invalidation region (input invalidation region 351 (FIG. 3), for example) while causing display 320 to display image IMG02.

In this way, during the control executed by short-range wireless communication, input of information by the user's unintended touch operation through touch sensor 350 of MFP 100 (operation panel 300) can be avoided.

Sixth Embodiment

<Summary>

MFP 100 according to a sixth embodiment may be identical in hardware configuration to any of MFPs 100 according to the first to fourth embodiments. In MFP 100 according to the sixth embodiment, when the presence of an object is detected near touch area 360, CPU 101 causes software keys to be arranged in a region other than a region near touch area 360. That is, the software keys for receiving input are not arranged in the region near touch area 360. This substantially invalidates input near touch area 360.

<Changing Arrangement of Software Keys Based on Detection of Presence of Object Near Touch Area>

Figure 22:
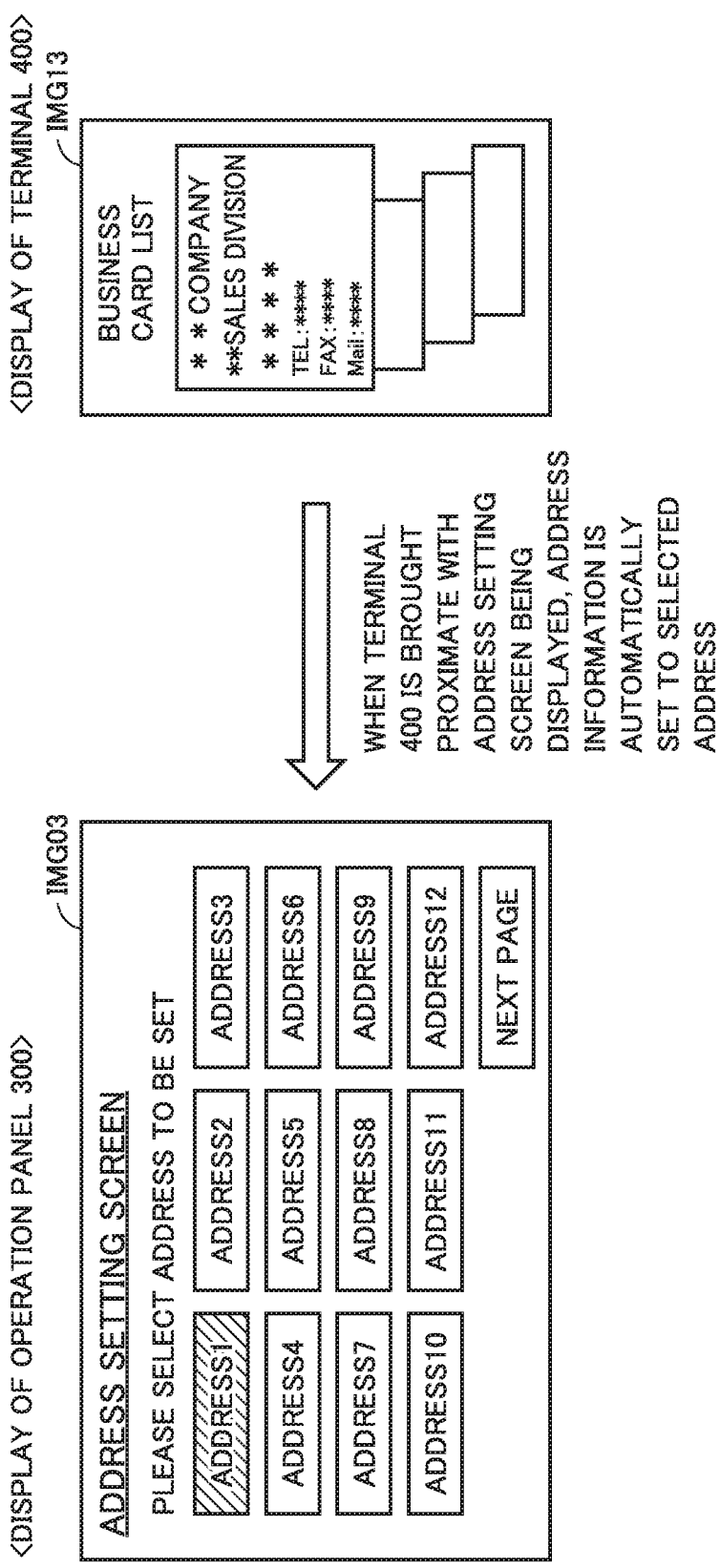
FIG. 22 is a diagram for use in explaining an exemplary screen displayed on a display of an operation panel of an MFP according to a sixth embodiment.

Each of FIGS. 22 and 23 is a diagram for explaining changing the arrangement of software keys in display 320, based on detection of the presence of an object near touch area 360. An arrangement of software keys before being changed is shown in FIG. 22. An arrangement of software keys after being changed is shown in FIG. 23.

More specifically, an exemplary screen displayed on display 320 on the MFP 100 side is shown as an image IMG03. An exemplary screen displayed on display 404 on the mobile terminal 400 side is displayed as an image IMG13.

Image IMG03 on the mobile terminal 400 side is a screen for selection of a document to be transmitted via MFP 100. The document is selected in mobile terminal 400, and then an instruction for transmitting the document is transmitted to MFP 100 over short-range wireless communication. CPU 101 of MFP 100 then causes display 320 to display image IMG03. Image IMG03 includes twelve software keys for selection of addresses to which the document is directed ("ADDRESS 1" to "ADDRESS 12") and a software key for displaying other addresses ("NEXT PAGE").

Note that during a period of time in which the presence of an object is being detected near touch area 360, CPU 101 causes image IMG04 shown in FIG. 23 instead of IMG03 shown in FIG. 22 to be displayed on display 320. As compared to image IMG03, in image IMG04, software keys for receiving information by a touch operation are not arranged in a right-hand region where display 320 is adjacent to touch area 360. More specifically, as compared to image IMG03 shown in FIG. 22 in which the software keys are arranged in the three rows on the left, in the middle, and on the right, in image IMG04 shown in FIG. 23, the software keys are arranged in the two rows on the left and in the middle, and not in the region corresponding to the right-hand row shown in image IMG03.

In image IMG04, therefore, input by a touch operation is substantially invalidated because no software keys are arranged in the region of display 320 (touch sensor 350) near touch area 360.

According to the present disclosure, in the image processing apparatus, the short-range wireless sensing unit is arranged near the touch panel for sensing radio waves for short-range wireless communication. The presence of an object near the short-range wireless sensing unit can be contactlessly sensed. In the image processing apparatus, when the presence of the object is sensed, reception of input to a region near the short-range wireless sensing unit of the touch panel is invalidated. In this way, even if the user's hand unintentionally touches the touch panel of the image processing apparatus, operation of the image processing apparatus in response to such an unintentional contact can be avoided.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
a touch panel capable of displaying a plurality of software keys;
a controller for controlling the image processing apparatus based on information provided to said touch panel in response to a user's touch operation on said software keys;
a short-range wireless sensor arranged near said touch panel, for sensing a radio wave for short-range wireless communication with a mobile terminal;
a plurality of object sensors configured to contactlessly sense presence of an object near said short-range wireless sensor, wherein each of the object sensors is configured to sense a presence of the object independently from the short-range wireless sensor and independently from one another, the object sensors being spaced apart from one another on the image processing apparatus and each being configured to detect objects at different distances from the image processing apparatus,
said controller being configured to invalidate input in a region by changing an arrangement of said software keys on a display of said software keys on said touch panel such that said software keys are not arranged in the region of said touch panel near said short-range wireless sensor when the presence of the object near said short-range wireless sensor is sensed by at least one of said object sensors; and
a short-range wireless communication unit that transmits and receives information over short-range wireless communication, wherein
when said short-range wireless communication unit does not start short-range wireless communication within a certain time after invalidation of input to the region of said touch panel near said short-range wireless sensor due to the presence of said object sensed by said object sensor, said controller cancels invalidation of the input to the region of said touch panel near said short-range wireless sensor.

2. The image processing apparatus according to claim 1, wherein
the image forming apparatus includes a short-range wireless communication unit that transmits and receives information over short range wireless communication, and
said controller determines, when said short-range wireless communication unit is conducting short-range wireless communication, that the presence of said object near said short-range wireless sensor is being sensed by said object sensor.

3. The image processing apparatus according to claim 1, wherein said object sensor is a sensor arranged near said touch panel.

4. The image processing apparatus according to claim 3, wherein said object sensor arranged near said touch panel identifies different positions where said object is present.

5. The image processing apparatus according to claim 4, wherein
said controller specifies a region where input is to be invalidated, based on a position of said object identified based on a detection output from said sensor arranged near said touch panel.

6. The image processing apparatus according to claim 1, wherein
when the presence of said object near said short-range wireless sensor is sensed by said object sensor, said controller receives only an input related to short-range wireless communication among inputs to the region of said touch panel near said short-range wireless sensor.

7. The image processing apparatus according to claim 1, wherein when input of specific information is being received by said touch panel, said controller receives input to the region of said touch panel near said short-range wireless sensor even if the presence of said object near said short-range wireless sensor is sensed by said object sensor.

8. A method for controlling an image processing apparatus comprising a touch panel capable of displaying a plurality of software keys, the method comprising:
receiving input of information provided to said touch panel in response to a user's touch operation on said software keys;
contactlessly sensing, by a plurality of object sensors, presence of an object near a short-range wireless sensor, said short-range wireless sensor being arranged near said touch panel for sensing a radio wave for short-range wireless communication with a mobile terminal, each of said object sensors being separate from said short-range wireless sensor, and each of said object sensors being configured to sense a presence of the object independently from the short-range wireless sensor and independently from one another, the object sensors being spaced apart from one another on the image processing apparatus and being configured to detect objects at different distances from the image processing apparatus;
invalidating input in a region by changing an arrangement of said software keys on a display of said software keys on said touch panel such that said software keys are not arranged in the region of said touch panel near said short-range wireless sensor when the presence of the object near said short-range wireless sensor is sensed by at least one of said object sensors; and when short-range wireless communication between the image processing apparatus and the mobile terminal does not start within a certain time after invalidation of input to the region of said touch panel near said short-range wireless sensor due to presence of said object sensed by said object sensor, canceling invalidation of the input to the region of said touch panel near said short-range wireless sensor.

9. A non-transitory storage medium encoded with a computer readable program executed by a computer of an image processing apparatus comprising a touch panel capable of displaying a plurality of software keys, said program causing said computer of said image processing apparatus to:

receive input of information provided to said touch panel in response to a user's touch operation on said software keys;

contactlessly sense presence of an object near a short-range wireless sensor, by a plurality of object sensors, said short-range wireless sensor being arranged near said touch panel for sensing a radio wave for short-range wireless communication with a mobile terminal, each of said object sensors being separate from said short-range wireless sensor, and each of said object sensors being configured to sense a presence of the object independently from the short-range wireless sensor and independently from one another, the object sensors being spaced apart from one another on the image processing apparatus and being configured to detect objects at different distances from the image processing apparatus;

invalidate input in a region by changing an arrangement of said software keys on a display of said software keys on said touch panel such that said software keys are not arranged in the region of said touch panel near said short-range wireless sensor when the presence of the object near said short-range wireless sensor is sensed by at least one of said object sensors; and when short-range wireless communication between the image processing apparatus and the mobile terminal does not start within a certain time after invalidation of input to the region of said touch panel near said short-range wireless sensor due to presence of said object sensed by said object sensor, cancel invalidation of the input to the region of said touch panel near said short-range wireless sensor.

* * * * *